United States Patent
Toyoda et al.

(10) Patent No.: US 10,037,699 B1
(45) Date of Patent: Jul. 31, 2018

(54) SYSTEMS AND METHODS FOR MOTIVATING A DRIVER ACCORDING TO BEHAVIORS OF NEARBY VEHICLES

(71) Applicants: Toyota Motor Engineering & Manufacturing North America, Inc., Erlanger, KY (US); Toyota Jidosha Kabushiki Kaisha, Toyota-shi, Aichi-ken (JP)

(72) Inventors: Heishiro Toyoda, Ann Arbor, MI (US); Hiroto Hamada, Aichi (JP)

(73) Assignees: Toyota Motor Engineering & Manufacturing North America, Inc., Plano, TX (US); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/641,840

(22) Filed: Jul. 5, 2017

Related U.S. Application Data (60) Provisional application No. 62/501,855, filed on May 5, 2017.

(51) Int. Cl.
  *G08G 1/16* (2006.01)
(52) U.S. Cl.
  CPC .............. *G08G 1/166* (2013.01); *G08G 1/16* (2013.01)
(58) Field of Classification Search
  CPC ...... B60W 30/09; B60W 30/12; B60W 30/18; B60W 2250/30; B60W 2250/302; B60W 2250/304; B60W 2250/306; B60W 2250/308; G08G 1/16; G08G 1/166; G08G 1/20; G08G 1/202; G08G 1/205; B60K 37/04
  See application file for complete search history.

(56) References Cited

U.S. PATENT DOCUMENTS

| | | | |
|---|---|---|---|
| 7,982,620 B2 | 7/2011 | Prokhorov et al. | |
| 8,629,784 B2 | 1/2014 | Szczerba et al. | |
| 8,665,079 B2 * | 3/2014 | Pawlicki | G06T 7/13 340/435 |
| 9,164,507 B2 | 10/2015 | Cheatham, III et al. | |
| 9,251,715 B2 | 2/2016 | Hing et al. | |
| 9,623,875 B2 | 4/2017 | Beyene et al. | |
| 9,643,605 B2 * | 5/2017 | Pawlicki | B60T 7/22 |
| 9,834,216 B2 * | 12/2017 | Pawlicki | B60W 30/18 |
| 2008/0204208 A1 | 8/2008 | Kawamata et al. | |
| 2009/0073000 A1 * | 3/2009 | Chae | G08G 1/167 340/937 |

(Continued)

*Primary Examiner* — Van Trieu
(74) *Attorney, Agent, or Firm* — Christopher G. Darrow; Darrow Mustafa PC (57) ABSTRACT

System, methods, and other embodiments described herein relate to inducing awareness in a driver about a surrounding environment of a primary vehicle. In one embodiment, a method includes, in response to detecting that a nearby vehicle is present within a defined range of the primary vehicle, generating a behavior characterization of the nearby vehicle according to at least sensor data from one or more sensors of the primary vehicle. The method includes indicating to the driver of the primary vehicle the behavior characterization of the nearby vehicle to inform the driver of how surrounding vehicles including the nearby vehicle are operating and to induce the driver to be engaged with the surrounding environment of the primary vehicle.

20 Claims, 6 Drawing Sheets

(56) References Cited

U.S. PATENT DOCUMENTS

| | | | |
|---|---|---|---|
| 2010/0020169 A1* | 1/2010 | Jang | G01C 21/36 |
| | | | 348/115 |
| 2014/0266655 A1 | 9/2014 | Palan | |
| 2014/0266656 A1 | 9/2014 | Hing et al. | |
| 2014/0354684 A1 | 12/2014 | Beckwith et al. | |
| 2017/0088142 A1 | 3/2017 | Hunt et al. | |
| 2017/0330463 A1* | 11/2017 | Li | G08G 1/166 |

* cited by examiner

SYSTEMS AND METHODS FOR MOTIVATING A DRIVER ACCORDING TO BEHAVIORS OF NEARBY VEHICLES

CROSS REFERENCE TO RELATED APPLICATIONS

This application claims benefit of U.S. Provisional Application No. 62/501,855, filed on May 5, 2017, which is herein incorporated by reference in its entirety.

TECHNICAL FIELD

The subject matter described herein relates in general to systems for engaging a driver on driving tasks and, more particularly, to using indicators about behaviors of nearby vehicles to motivate the driver to engage with the driving tasks and remain aware of a surrounding environment.

BACKGROUND

Many different factors can influence whether a driver engages with and is aware of driving tasks and environmental aspects relating to the operation of a vehicle. For example, a driver can choose to focus on various personal electronic devices (e.g., smartphone), infotainment integrated with the vehicle, interacting with passengers, viewing surrounding drivers/scenic views, and so on. Moreover, even when the driver attempts to actively engage with the driving tasks, vigilance decrement can cause the driver to experience a loss of vigilance as time progresses. Thus, ensuring vigilance of the driver and awareness about the surroundings of the vehicle can present many difficulties.

As a further matter, approaches that provide audible alerts to maintain vigilance and/or to inform the driver of risks can be interpreted as an annoyance by the driver instead of an effective manner of engaging the driver. Additionally, further approaches that require a driver to keep their hands on the steering wheel and/or to maintain their eyes forward-facing can also be ineffective since the driver may engage in the noted postures to simply satisfy the monitoring system while still daydreaming or focusing on other tasks. Consequently, the noted approaches can fail to achieve maintaining engagement by the driver.

SUMMARY

In one embodiment, example systems and methods relate to a manner of indicating behaviors about nearby vehicles to a driver in order to induce the driver to engage with the nearby vehicles and a surrounding environment of a vehicle operated by the driver. For example, an engagement system as discussed herein monitors a surrounding environment of a primary vehicle driven by the driver for other/nearby vehicles. That is, the engagement system collects sensor data from one or more sensors of the primary vehicle and analyzes the sensor data to identify nearby vehicles and when the nearby vehicles move within a defined range of the primary vehicle. Subsequently, the engagement system analyzes the sensor data collected about the nearby vehicle to produce a behavior characterization for the nearby vehicle. The behavior characterization is, for example, a classification of a driving style exhibited by the nearby vehicle. Thus, in one example, the behavior characterization can indicate an affirmative response when the driving style of the nearby vehicle is perceived to be a positive example and as a denouncing response when the driving style of the nearby vehicle is perceived to be poor.

Consequently, the engagement system can then provide the behavior characterization to the driver of the primary vehicle in order to induce the driver to engage with the surrounding environment of the primary vehicle. That is, by providing indications about the behaviors of nearby vehicles, the engagement system induces the driver to be self-motivated about being aware of the surroundings and since, for example, the indications can cause a sense of competition, and/or interactivity with the nearby vehicles that otherwise is not present. In this way, the engagement system induces the driver to be aware of and engaged with the surrounding environment of the primary vehicle.

In one embodiment, an engagement system inducing awareness in a driver of a primary vehicle about a surrounding environment is disclosed. The engagement system includes one or more processors with a memory communicably coupled to the one or more processors. The memory stores a monitoring module including instructions that when executed by the one or more processors cause the one or more processors to, in response to detecting that a nearby vehicle is present within a defined range of the primary vehicle, generate a behavior characterization of the nearby vehicle according to at least sensor data from one or more sensors of the primary vehicle. The memory stores an engagement module including instructions that when executed by the one or more processors cause the one or more processors to indicate to the driver of the primary vehicle the behavior characterization of the nearby vehicle to inform the driver of how surrounding vehicles including the nearby vehicle are operating and to induce the driver to be engaged with the surrounding environment of the primary vehicle.

A non-transitory computer-readable medium for inducing awareness in a driver of a primary vehicle about a surrounding environment. The non-transitory computer-readable medium storing instructions that when executed by one or more processors cause the one or more processors to, in response to detecting that a nearby vehicle is present within a defined range of the primary vehicle, generate a behavior characterization of the nearby vehicle according to at least sensor data from one or more sensors of the primary vehicle. The instructions include instructions to indicate to the driver of the primary vehicle the behavior characterization of the nearby vehicle to inform the driver of how surrounding vehicles including the nearby vehicle are operating and to induce the driver to be engaged with the surrounding environment of the primary vehicle.

A method for inducing awareness in a driver about a surrounding environment of a primary vehicle. In one embodiment, a method includes, in response to detecting that a nearby vehicle is present within a defined range of the primary vehicle, generating a behavior characterization of the nearby vehicle according to at least sensor data from one or more sensors of the primary vehicle. The method includes indicating to the driver of the primary vehicle the behavior characterization of the nearby vehicle to inform the driver of how surrounding vehicles including the nearby vehicle are operating and to induce the driver to be engaged with the surrounding environment of the primary vehicle.

BRIEF DESCRIPTION OF THE DRAWINGS

The accompanying drawings, which are incorporated in and constitute a part of the specification, illustrate various systems, methods, and other embodiments of the disclosure.

It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with improving driver engagement are disclosed. As mentioned previously, a driver may become disengaged from the vehicle and driving tasks for many different reasons. However, whether the source of disengagement is actively induced through distracted behaviors such as using personal electronic devices or occurs passively for other reasons, driver disengagement presents difficulties in relation to safety and appropriate operation of a vehicle.

Thus, embodiments of an engagement system and associated methods are disclosed herein to promote driver engagement and awareness of how nearby vehicles are operating. In one embodiment, functionality implemented by a disclosed engagement system is provided according to analogous concepts associated with the Marginal Value Theorem (MVT). The marginal value theorem generally relates to motivations of an animal to move between foraging locations when seeking food. For example, motivations relating to risks of a present location, efforts to obtain food, and so on control whether an animal decides to remain in a particular location or move to another location to forage. When the various factors are balanced the animal may remain in a present foraging location due to the motivations to stay in-place or a lack of motivations to leave and seek an additional food source. However, an imbalance in the noted factors can motivate the animal to seek further foraging locations.

Thus, in a similar way, the presently disclosed engagement system and associated methods provide for the driver self-engaging on driving tasks. That is, for example, the disclosed engagement system provides for functionality that causes the driver to engage with the vehicle and a surrounding environment of the vehicle. Accordingly, in one embodiment, the engagement system includes functionality to generate an urge within the driver to engage in boring driving tasks (e.g., monitoring nearby vehicles) in an unconscious manner. That is, instead of providing active alerts that are generated to inform the driver that the driver needs to be aware, the engagement system induces feelings or urges within the driver to make the driver want to engage the vehicle and the surrounding environment.

Consequently, as described herein in various embodiments, the engagement system can employ different indicator mechanisms (e.g., interactive AR display elements, audible indicators, in-dash lights/displays) to engage the driver with the vehicle and the surrounding environment of the vehicle. Accordingly, the disclosed systems and methods improve driver engagement on driving tasks and awareness of surroundings through motivating the self-engagement of the driver.

Thus, the engagement system is, for example, implemented within the vehicle along with, in one embodiment, further systems such as an augmented reality (AR) system, and so on. Therefore, in one embodiment, the engagement system simultaneously monitors surroundings of the vehicle, while controlling an augmented reality display to render visuals about nearby vehicles to cause the driver to self-engage with the driving tasks.

For example, in one embodiment, the engagement system can monitor the surrounding environment to identify nearby vehicles and characteristics about how the nearby vehicles are operating. Accordingly, the engagement system can initially detect the presence of a nearby vehicle, monitor the vehicle to acquire driving characteristics indicative of how the nearby vehicle is being operated, and then generate indications to the driver about the driving characteristics. In this way, the engagement system induces the driver to be further aware of nearby vehicles and how the nearby vehicles are being operated. Moreover, in one embodiment, the engagement system provides the indicators to the driver as a manner of inducing a sense of competitiveness within the driver that causes the driver to be self-motivated in relation to being aware of the surrounding environment and also in relation to improving how the driver controls the vehicle.

Figure 1:
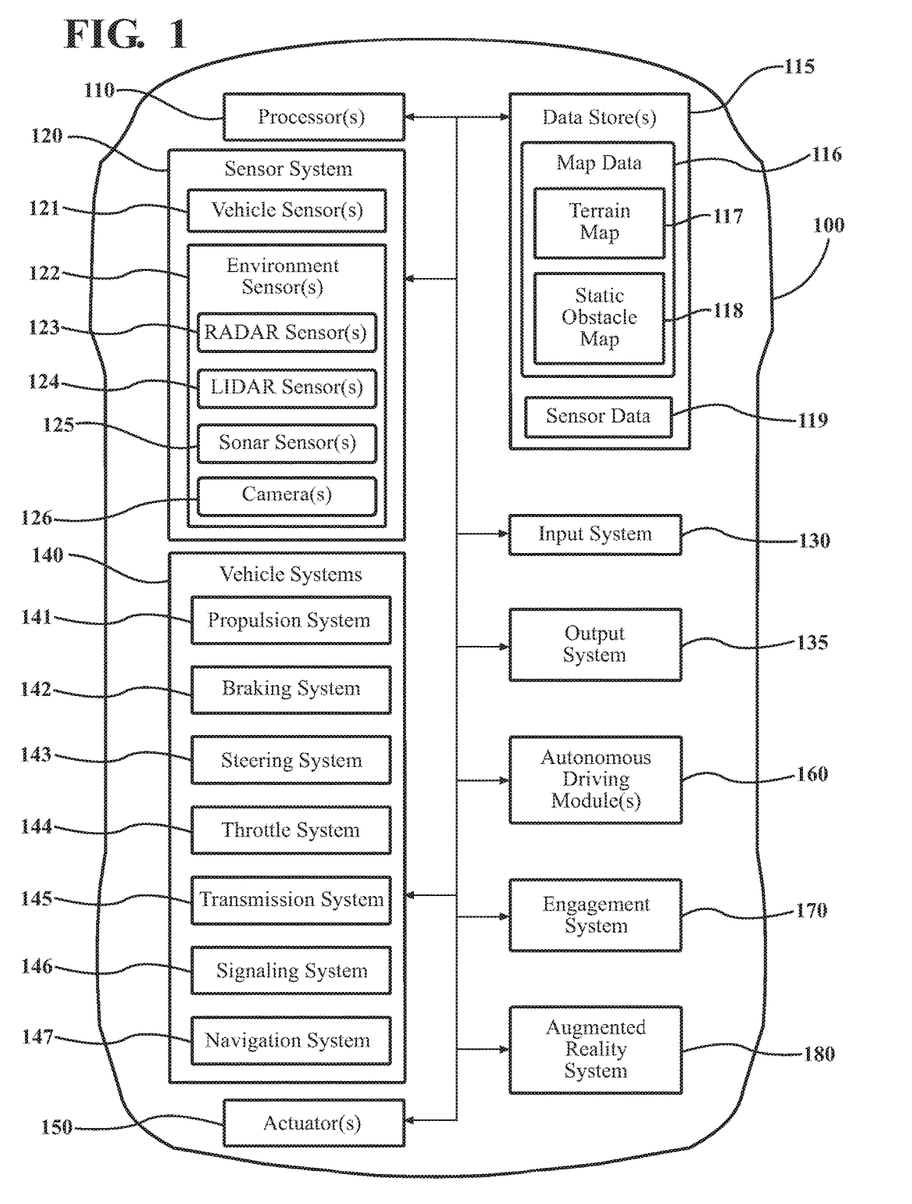
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes an engagement system 170 that is implemented to perform methods and other functions as disclosed herein relating to improving driver engagement through providing indications of driving characteristics about nearby vehicles through an AR system 180 or another means. As illustrated, the augmented reality (AR) system 180 is an additional component of the vehicle 100. However, it should be noted that while the AR system 180 is illustrated as a sub-component of the vehicle 100, in various embodiments, the AR system 180 can be partially integrated with the vehicle or separate from the vehicle 100. Thus, in one or more embodiments, the AR system 180 can communicate via a wired or wireless connection with the vehicle 100 to correlate functionality as discussed herein. Moreover, the AR system 180 can include one or more displays (e.g., integrated or mobile) within which to display graphic elements to the driver and/or passengers.

It should be appreciated that the AR system 180 can take many different forms but in general functions to augment or otherwise supplement viewing of objects within a real-world environment surrounding the vehicle 100. That is, for example, the AR system 180 can overlay graphics and animations of graphics using one or more AR displays in order to provide for an appearance that the graphics are integrated with the real-world. Thus, the AR system 180 can include displays integrated with a windshield, side windows, rear windows, mirrors and other aspects of the vehicle 100. In further aspects, the AR system 180 can include head-mounted displays such as goggles or glasses. In either case, the AR system 180 functions to render graphical elements that are in addition to objects in the real-world, modifications of objects in the real-world, and/or a combination of the two. In this way, the AR system 180 can augment or otherwise modify a view of a driver/passenger in order to provide the indications about nearby vehicles as an enriched/embellished visual sensory experience. The noted functions and methods will become more apparent with a further discussion of the figures.

Figure 2:
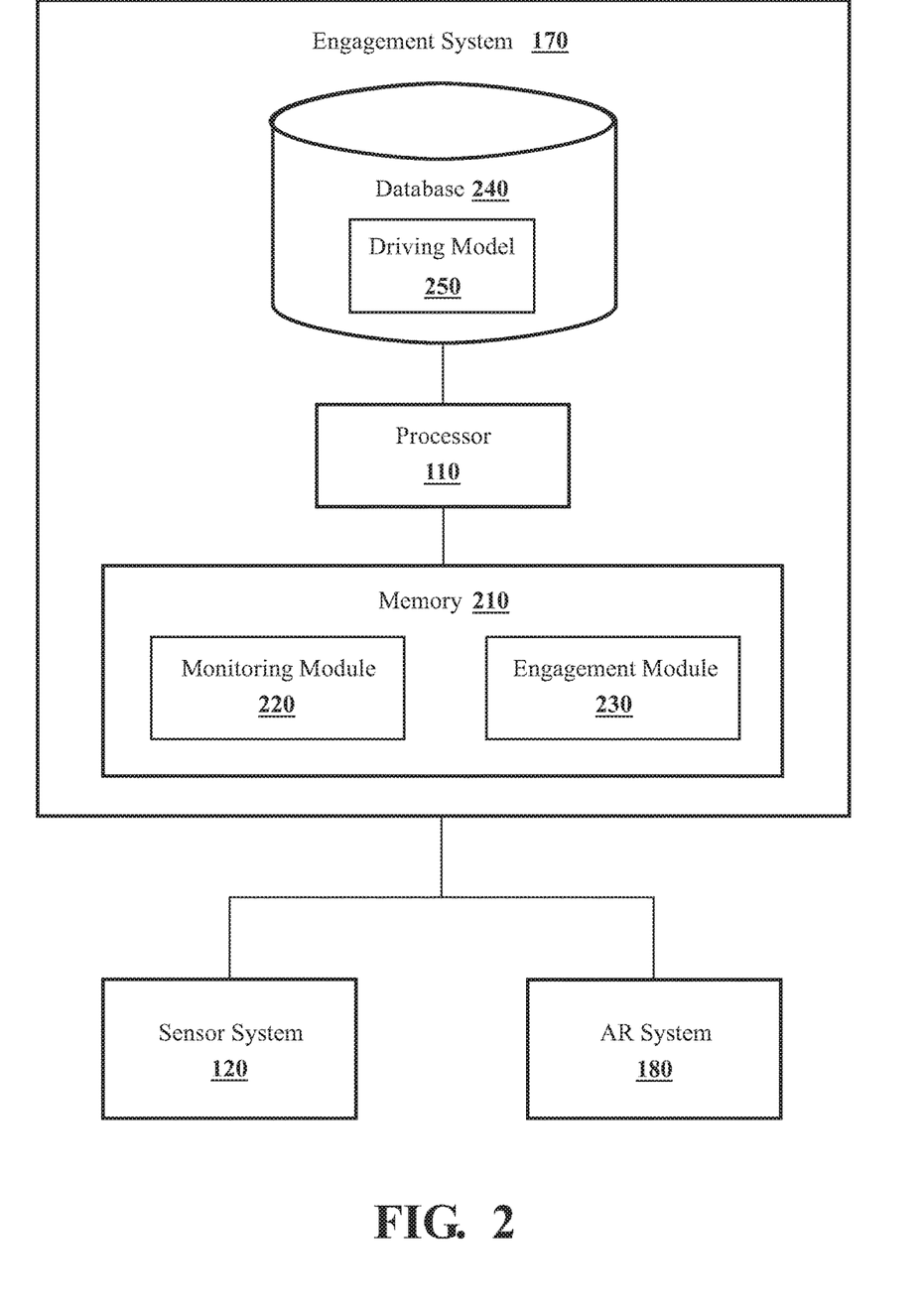
FIG. 2 illustrates one embodiment of an engagement system that is associated with characterizing behaviors of nearby vehicles.

With reference to FIG. 2, one embodiment of the engagement system 170 of FIG. 1 is further illustrated. The engagement system 170 is shown as including a processor 110 from the vehicle 100 of FIG. 1. Accordingly, the processor 110 may be a part of the engagement system 170, the engagement system 170 may include a separate processor from the processor 110 of the vehicle 100, or the engagement system 170 may access the processor 110 through a data bus or another communication path. In one embodiment, the engagement system 170 includes a memory 210 that stores a monitoring module 220 and an engagement module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the monitoring module 220 generally includes instructions that function to control the processor 110 to collect sensor data from one or more sensors of the vehicle 100. The sensor data is, in one embodiment, collected electronic data about observations of one or more objects in an environment proximate to and surrounding the vehicle 100 and/or other aspects about the surroundings. Moreover, in further aspects, the sensor data can include information about the driver, information about contextual aspects of the present environment (e.g., time of day, the day of the year, school zones, proximity to parks, etc.), and so on. Thus, the monitoring module 220 controls the sensor system 120 to collect data about both the surroundings, and about a state of the driver.

In one embodiment, driver state information is information that characterizes present actions of the driver, where a gaze of the driver may be directed, autonomic responses of the driver, biological responses/conditions of the driver, and so on. By way of example, the driver state information can include information about a direction of a gaze, a path/track of the gaze, heart rate, blood pressure, respiratory function, blood oxygen levels, perspiration levels, pupil dilation/size, brain activity (e.g., EEG data), salivation information, hand/arm positions, foot/leg positions, a general orientation of the driver in the vehicle 100 (e.g., forward-facing, rear-facing, etc.), seat position, rate of movement, facial feature movements (e.g., mouth, blinking eyes, moving head, etc.), and so on.

Additionally, the monitoring module 220 can determine the driver state information in multiple different ways depending on a particular implementation. In one embodiment, the monitoring module 220 communicates with various sensors of the sensor system 120 including one or more of: camera(s) 126 (e.g., for gaze/eye tracking), heart rate monitor sensors, infrared sensors, seat position sensors, and so on. In one embodiment, the sensors are located within a passenger compartment of the vehicle 100 and can be positioned in various locations in order to acquire information about the noted aspects of the driver and/or aspects related to the driver.

Consequently, the monitoring module 220 can, in one embodiment, analyze the driver state information to determine whether provided indications are inducing engagement of the driver with the nearby vehicles. In either case, the monitoring module 220 collects sensor data about a surrounding environment of the vehicle 100 in order to detect when other vehicles are present and to characterize driving behaviors of the nearby vehicles.

For example, the monitoring module 220 controls one or more sensors of the sensor system 120 to track nearby vehicles, acquire information about the nearby vehicles, and determine when the nearby vehicles come within a defined range of the vehicle 100 (e.g., distance to which the driver is aware of other vehicles, limit of one or more sensors, etc.). Accordingly, in one embodiment, the monitoring module 220 can initially detect a presence of a nearby vehicle using, for example, the cameras 126 that are mounted on an exterior of the vehicle 100. After the initial detection of the nearby vehicle, the monitoring module 220, for example, tracks the nearby vehicle for a period of time, and/or until the nearby vehicle moves within a defined range of the vehicle 100. Thus, the monitoring module 220 can scan the nearby vehicle using the cameras 126, the radar 123, the lidar 124, and/or various combinations of sensors along with, in one embodiment, acquiring various contextual information such as weather, speed limits, time of day, and so on.

Thus, in one embodiment, the engagement system 170 includes a database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 stores the sensor data along with, for example, metadata that characterizes various aspects of the sensor data. For example, the metadata can include location coordinates (e.g., longitude and latitude), relative map coordinates or tile identifiers, time/date stamps from when the separate sensor data was generated, and so on.

Moreover, the database 240 may include one or more computational and/or statistical models such as driving model 250. In one embodiment, the driving model 250 characterizes the sensor data about nearby vehicles in order to identify behavior characterizations associated with how the nearby vehicles are operating. That is, the monitoring module 220 uses the driving model 250 to identify behavior characterizations according to the sensor data collected by the monitoring module 220. In one embodiment, the driving model 250 informs the monitoring module 220 about a likelihood of correlations between a particular driving style, aptitude, and/or other aspect of how the nearby vehicle is operating as a function of the sensor data so that the monitoring module 220 can generate the behavior characterization.

In either case, the monitoring module 220 collects various information about how the nearby vehicle is operating in the surrounding environment in order to generate the behavior characterization of the nearby vehicle. That is, the monitoring module 220 acquires the sensor data about the nearby vehicle in order to characterize or otherwise assess how the nearby vehicle is operating. Thus, in one embodiment, after the defined period of time has elapsed and/or the vehicle moves within the defined the range, the monitoring module 220 has acquired at least some sensor data about the nearby vehicle.

Accordingly, the monitoring module 220 analyzes the sensor data to generate a behavior characterization of the nearby vehicle that, for example, defines a driving style, driving aptitude, flare, and/or other metric that classifies how the nearby vehicle is operating. In one embodiment, the monitoring module 220 in combination with one or more models (e.g., the driving model 250) can form a computational model such as a machine learning logic, deep learning logic, a neural network model, or another similar approach. In either case, the monitoring module 220 electronically accepts various input data about the nearby vehicle, aspects relating to, for example, a present operating environment (e.g., surroundings and contextual aspects such as weather), and other electronic data (e.g., dynamic vehicle data) as electronic inputs. Accordingly, the monitoring module 220 in concert with the driving model 250 produces a behavior characterization (e.g., nearby vehicle assessments/driving styles/scores/likes/dislikes, etc.) as an electronic output that characterizes the noted aspect as, for example, a single electronic value. Moreover, in further aspects, the engagement system 170 can collect/store the noted data, log responses, and use the data and responses to subsequently further train the models (e.g., model 250).

Moreover, while the collection of sensor data and analysis is discussed in relation to a single nearby vehicle, it should be appreciated that the monitoring module 220 can track and analyze a plurality of different nearby vehicles simultaneously in order generate behavior characterizations for vehicles that are within the surrounding environment of the vehicle 100.

Thus, in one embodiment, the engagement module 230 generally includes instructions that function to control the processor 110 to provide indications of the behavior characterizations to the driver. That is, for example, the engagement module 230 controls one or more of the vehicle systems 140, and or other components of the vehicle 100 to provide the behavior classification to the driver.

Accordingly, in one embodiment, the engagement module 230 renders one or more graphical elements as an overlay of the nearby vehicle to provide the behavior characterization to the driver about the nearby vehicle through, for example, the AR system 180. That is, the engagement module 230 can indicate the behavior characterization to the driver using graphics displayed through an AR display. In further aspects, the engagement module 230 can provide the behavior characterization using an in-dash display, one or more lights on an instrument panel, using haptic feedback, using audible messages, and so on. Whichever means is used to provide the behavior characterization, the behavior characterization itself is, for example, a positive indicator (e.g., thumbs up) indicating affirmative driving style, a negative indicator (e.g., thumbs down) indicating that the characterization is denouncing how the nearby vehicle is being operated, and so on. In further aspects, the behavior characterization can take different forms including, but not limited to, a numerical score, an A-F grade, emoticons (e.g., smiley face, sad face, angry face, etc.), coloring that corresponds with mood/grade, and so on. Further aspects of the engagement system 170 and the behavior characterization will be discussed subsequently.

Figure 3:
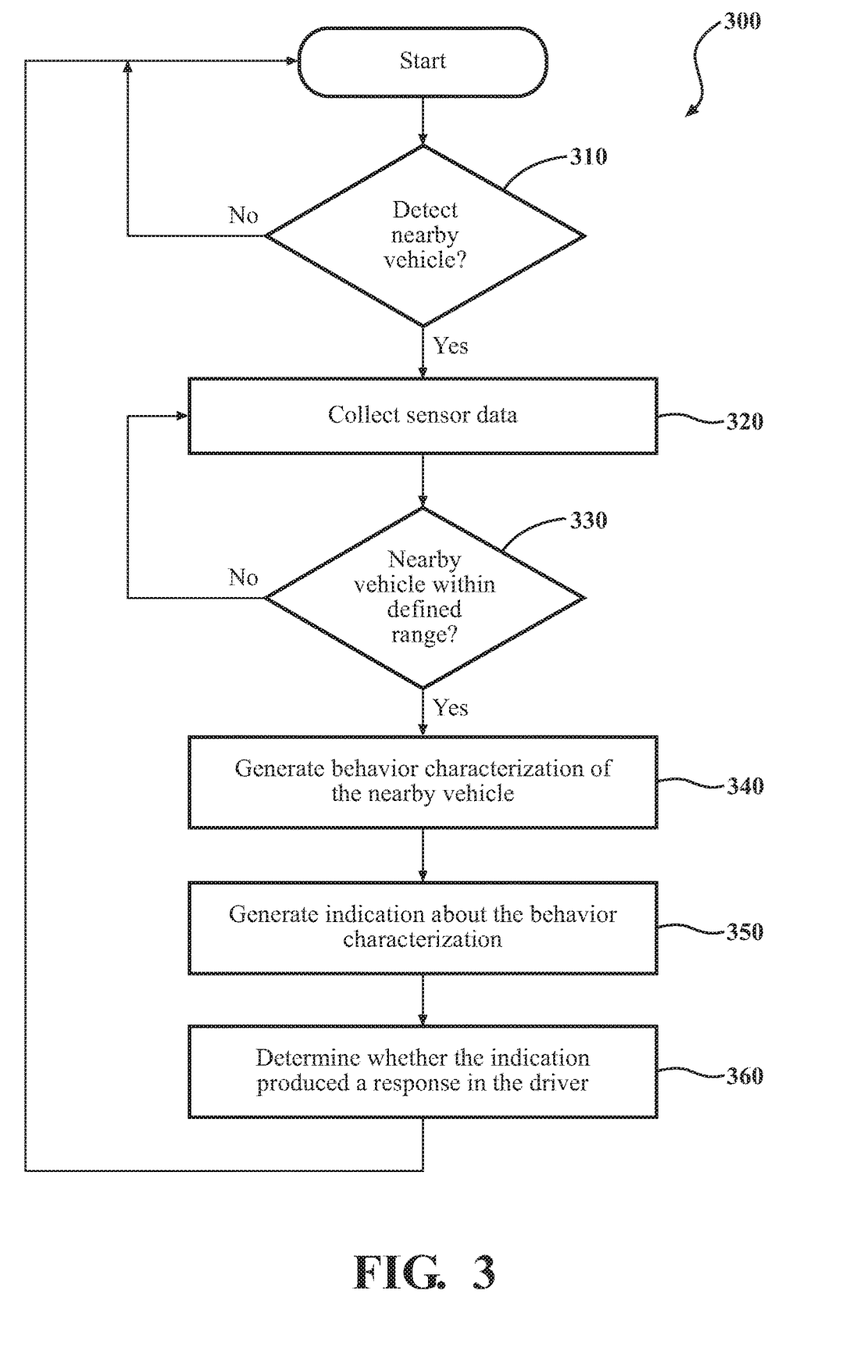
FIG. 3 illustrates one embodiment of a method that is associated with inducing driver engagement by generating indications about behaviors of nearby vehicles to the driver.

FIG. 3 illustrates a flowchart of a method 300 that is associated with inducing driver engagement through characterizing driving behaviors of nearby vehicles. Method 300 will be discussed from the perspective of the engagement system 170 of FIGS. 1 and 2. While method 300 is discussed in combination with the engagement system 170, it should be appreciated that the method 300 is not limited to being implemented within the engagement system 170, but is instead one example of a system that may implement the method 300.

At 310, the monitoring module 220 monitors surroundings of the vehicle 100 to detect when a nearby vehicle is present. In one embodiment, the monitoring module 220 initially monitors the surrounding environment to detect whether nearby vehicles are present at and/or beyond a defined range. That is, as will be subsequently discussed in greater detail, the monitoring module 220 determines a behavior characterization for a nearby vehicle once the nearby vehicle moves within the defined range. However, at 310, the monitoring module 220 initially detects a presence of the nearby vehicle in order to, for example, subsequently collect data at 320 that can be analyzed at 340, once the nearby vehicle is within the defined range to produce the behavior characterization.

Accordingly, at 310, the monitoring module 220 performs an initial monitoring to identify, for example, a nearby vehicle that was previously not present but is, for example, approaching the vehicle 100 (i.e., distance between the nearby vehicle and the vehicle 100 is decreasing). Thus, in one embodiment, the monitoring module 220 controls the cameras 126 or another sensor of the vehicle 100 that is capable of long range detection of objects such as nearby vehicles. In this way, the monitoring module 220 can collect sensor data about the nearby vehicle, as discussed at 320.

At 320, the monitoring module 220 collects data from at least one sensor of the vehicle 100. In one embodiment, the monitoring module 220 collects data from sensors of the sensor system 120 including the camera 126, the lidar 124, the radar 123, and/or other sensors on at least a semi-continuous basis. That is, for example, the monitoring module 220 collects the sensor data every x seconds (e.g., 0.1 s) to maintain an up-to-date view of the surrounding environment including the nearby vehicles. In general, the monitoring module 220 is operable to collect data from whichever sensors are available within the vehicle 100 and/or collect data from third party sources (e.g., weather sources, traffic sources, etc.) through, for example, a communications system of the vehicle 100. In either case, the monitoring module 220 generally collects data associated with the nearby vehicles, and information about the surrounding environment to inform the subsequent analysis of the nearby vehicles.

For example, the monitoring module 220 can collect environmental information, contextual information, and driver state information. The environmental information is information about the surroundings of the vehicle 100 including information about objects (e.g., locations and trajectories), obstacles, terrain, surfaces, nearby vehicles include trajectories and metadata, and so on. By way of example, the sensor data can include electronic data about a present trajectory of the nearby vehicle, a projected trajectory of the nearby vehicle, driving patterns of the nearby vehicle, erratic maneuvers of the nearby vehicle, a following distance between the nearby vehicle and other surrounding vehicles, how closely the nearby vehicle is following speed limits or other traffic laws, and so on. The contextual information is generally ancillary data or metadata about a current location and/or general context including information such as a time of day, a day of the week, geopolitical boundaries, municipal boundaries and special districts (e.g., school zones), local laws (e.g., speed limits, HOV lane restrictions), operating characteristics of the vehicle 100 (e.g., brake wear, oil levels, etc.), weather, and so on.

In one aspect, the monitoring module 220 collects the driver state information to log how the driver responds to indications produced by the system 170. Generally, the driver state information characterizes a current awareness and physical state of the driver and includes, for example, a current gaze/line-of-sight of the driver, eye tracks/movements, rates of eye movements, pupil dilation, control input patterns, and/or other information that is indicative of engagement/awareness of the driver in relation to driving tasks and the surrounding environment.

In either case, monitoring module 220, after detecting the nearby vehicle at 310, collects information about the nearby vehicle that is useful in, for example, characterizing how the nearby vehicle is being operated. Thus, in one embodiment, the monitoring module 220 collects the data at 320 for at least a defined period of time (e.g., 10 s) in order to acquire a data sample that is sufficient to characterize the nearby vehicle. In further aspects, the monitoring module 220 collects the data at least until the nearby vehicle moves within the defined range as discussed at 330. In either case, the monitoring module 220 can collect electronic sensor data for multiple different nearby vehicles in order to subsequently characterize a manner in which the vehicles are being operated and about present contextual aspects (e.g., weather) to inform whether particular operating aspects of the nearby vehicles is appropriate for the current conditions.

At 330, the monitoring module 220 determines whether a nearby vehicle is within a defined range of the vehicle 100. In one embodiment, the monitoring module 220, after initially identifying a nearby vehicle, monitors the nearby vehicle at 320 to collect the sensor data and also monitors the nearby vehicle to determine when the nearby vehicle is within the defined range of the vehicle 100. That is, many surrounding vehicles may be present around the vehicle 100 with different vehicles passing in different directions, driving alongside, and so on. Accordingly, in one embodiment, the monitoring module 220 determines when the nearby vehicles are within a viewable distance or are otherwise proximate to the vehicle 100 such that a driver, for example, should be aware of the nearby vehicle or is otherwise likely to view the nearby vehicle as controlled by the defined range. That is, the defined range is a distance from the vehicle 100 that provides for permitting the monitoring module 220 to collect sensor data about the nearby vehicle prior to generating a characterization, and that defines a distance from the vehicle 100 within which the driver is likely to be aware/engaged.

Thus, the monitoring module 220, in one embodiment, tracks a trajectory and/or location of the nearby vehicle and determines when the nearby vehicle is within the defined range prior to generating the behavior characterization. In this way, the engagement system 170 can acquire data about how the nearby vehicle is being operated and also avoid providing indications about nearby vehicles that are beyond a distance at which, for example, the driver is generally aware and/or engaged.

At 340, the monitoring module 220 generates a behavior characterization of the nearby vehicle. In one embodiment, the behavior characterization identifies or otherwise classifies driving behaviors of the nearby vehicle according to a driving style. Thus, in one embodiment, the driving characterization indicates how safely the nearby vehicle is being operated. By contrast, in further embodiments, the behavior characterization is defined to highlight nearby vehicles that are being operated with flare or other interesting behaviors. In either case, the monitoring module 220 accepts the sensor data collected at 320 as an electronic input when generating the behavior characterization.

Thus, in one embodiment, the monitoring module 220 along with the driving model 250 forms a machine learning algorithm such as a neural network or other computational model that analyzes the sensor data about the nearby vehicle according to known correlations to generate the behavior characterization. In further embodiments, the monitoring module 220 implements a heuristic or a statistical analysis of the sensor data to analyze the sensor data and produce the behavior characterization. In either case, the behavior characterization correlates the sensor data with a particular driving style (e.g., aggressive, conservative, novice, etc.) that is then provided as output in the form of the behavior characterization. Thus, the monitoring module 220 can consider different aspects of how the nearby vehicle is operating such as a present trajectory of the nearby vehicle, a projected trajectory of the nearby vehicle, driving patterns (e.g., lane changes, speed profiles, steering variations) of the nearby vehicle, erratic maneuvers (e.g., swerving, excessive lane changes, etc.) of the nearby vehicle, a following distance (e.g., following too closely) between the nearby vehicle and the surrounding vehicles, how closely the nearby vehicle is following traffic laws (e.g., speed limits, stop signs, etc.), and so on. In either case, the monitoring module 220 produces the behavior characterization as, in one embodiment, a binary indication (e.g., good or bad), according to a scale (e.g., 0-100), according to a defined set of classifications (e.g., aggressive, conservative, offensive, etc.), or according to another defined set of classifications.

At 350, the engagement module 230 generates an indication about the behavior characterization generated for the nearby vehicle to the driver. As previously indicated, the method 300 can simultaneously track, collect sensor data, generate behavior characterizations, and provide the indications about the behavior characterizations for multiple nearby vehicles simultaneously. Thus, while the engagement system 170 is discussed as providing an indication for the noted nearby vehicle, it should be appreciated that indications can be provided simultaneously for multiple different nearby vehicles. Additionally, the separate indications that are provided at 350 can also, in one embodiment, be updated as the engagement system 170 collects further sensor data about how each nearby vehicle is operating.

In either case, the engagement module 230 indicates the behavior characterization to the driver of the vehicle 100 at 350. In one embodiment, the engagement module 230 controls the AR system 180 to render graphical elements as overlays of the nearby vehicles or proximate to the nearby vehicles in order to convey the behavior characterization to the driver. Thus, the engagement module 230 can control an AR display to generate graphics about the behavior characterization to inform the driver about how the nearby vehicle is operating. In further embodiments, the engagement module 230 controls an in-dash display of the vehicle 100 to provide the behavior indication, one or more lights on the instrument panel, or another suitable means of presenting the behavior indication to the driver. In general, how the behavior characterization is provided can take many different forms. Accordingly, in further embodiments, the engagement module 230 can indicate the behavior characterization using audible indicators (e.g., synthesized voice), haptic feedback, and so on. Moreover, as previously mentioned, the behavior characterization itself can be a binary indication of a positive indication (e.g., thumbs up) affirming a driving style of the nearby vehicle or a negative indication (e.g., thumbs down) denouncing the driving style.

In further embodiments, the engagement module 230 can produce the indication about the behavior characterization using different styles of graphics, text, animations, and so on that are either provided through the AR system 180 or through an in-dash display. In this way, the engagement module 230 produces the indication to cause the driver to have feelings of association with the nearby vehicles, induce competitive feelings for the driver to want to drive in a particular manner, and/or otherwise direct the attention of the driver to the nearby vehicles and, thus, to the surrounding environment and how the vehicle 100 is being controlled.

At 360, the engagement module 230 determines whether the indication produced at 350 induced a response in the driver. That is, the engagement module 230 can control one or more sensors within the vehicle 100 to collect driver state information in order to assess whether the driver notices the indications and/or is otherwise engaged/aware. In one embodiment, the engagement module 230 can track a gaze of the driver and/or other aspects relating to eye movements of the driver using a camera within an interior of the vehicle 100. In this way, the engagement module 230 can, in one embodiment, assess whether the indications evoke a response within the driver and, for example, subsequently adjust how the indications are provided. In further aspects, the engagement module 230 can log the responses for subsequent analysis and training of the driving model 250 by storing the sensor data in the database 240 or another storage location.

Figure 4:
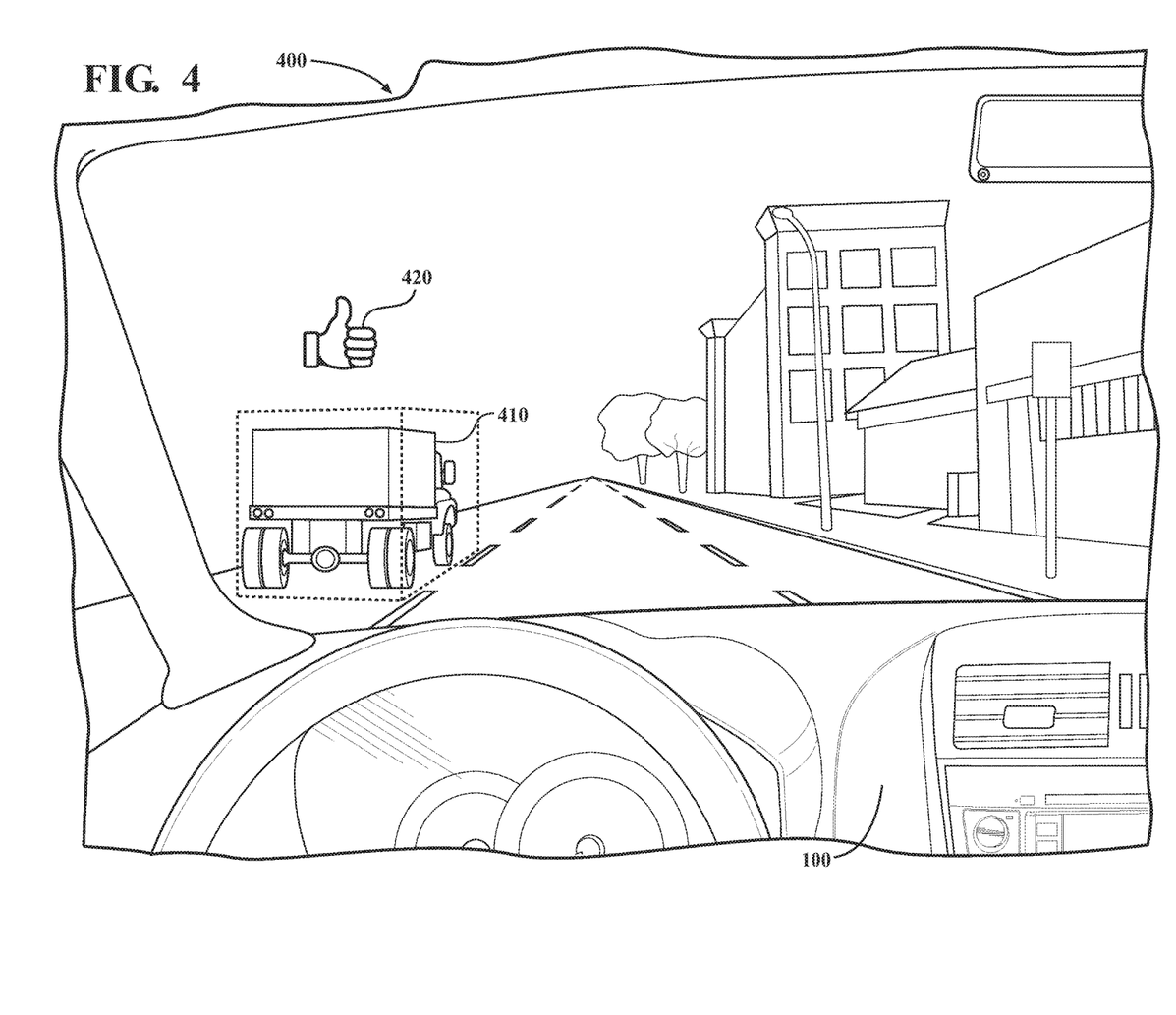
FIG. 4 is an interior view of a primary vehicle and graphical elements displayed within an augmented reality (AR) system about driving behavior characterizations.

Further explanation of the functioning of the engagement system 170 will be discussed in relation to FIGS. 4-6. With reference to FIG. 4, an interior view 400 of the vehicle 100 illustrates one example of graphical elements displayed by the AR system 180 at the direction of the engagement module 230. For example, the interior view 400 is a forward view through a windshield of the vehicle 100. Thus, the view 400 illustrates graphical elements as rendered through an AR display that is, for example, integrated with the windshield. Accordingly, as illustrated, the engagement system 170 has detected and collected sensor data about the nearby vehicle 410, which is a truck. As one example, assume that the vehicle 100 is traveling at a higher rate of speed and has reduced a distance between the nearby vehicle 410 over time. Accordingly, the monitoring module 220 initially detected that the vehicle 410 was present ahead of the vehicle 100, collected sensor data about how the vehicle 410 is operating, and, upon the vehicle 410 surpassing the defined range from the vehicle 100, generated a behavior characterization.

Accordingly, as illustrated, assume the vehicle 410 maintained a consistent trajectory in the outside lane for a duration of the monitoring module 220 collecting the sensor data. Moreover, the monitoring module 220 identifies present contextual information (e.g., weather, traffic, etc.) as being ideal and, therefore, not adjusting how expectations of how the vehicle 410 should be operating. Thus, when the monitoring module 220 generates the behavior characterization of the nearby vehicle 410 for the noted sensor data, the determination is, for example, a positive driving style. Thus, the engagement module 230 generates a thumbs up 420 within the AR display that is rendered above the vehicle 410. In this way, the engagement system 170 provides a visual cue using the behavior characterization 420 to the driver about how the vehicle 410 is being operated and thereby induces the driver to be engaged and aware of the vehicle 410.

Figure 5:
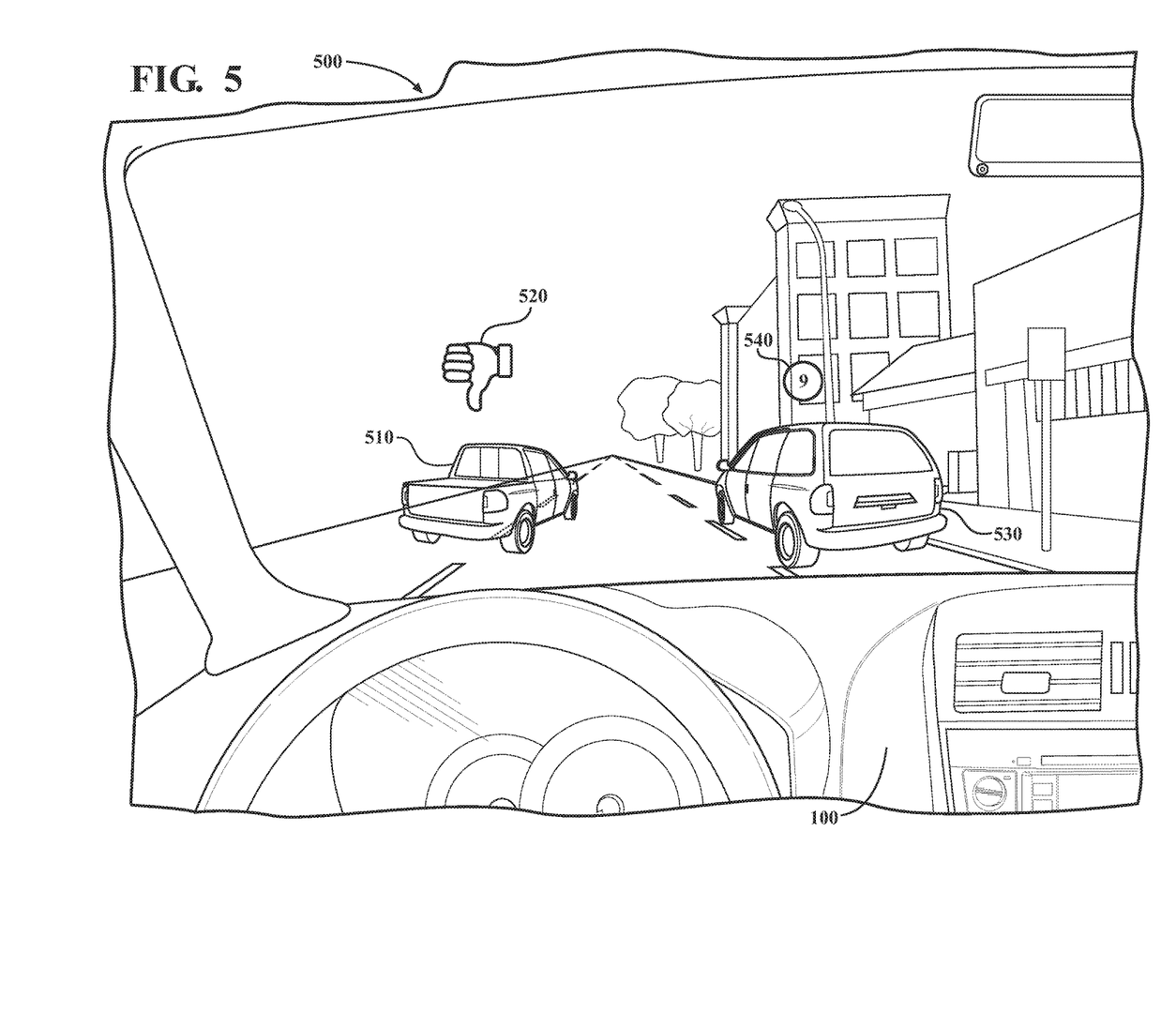
FIG. 5 is another interior view of a primary vehicle and graphical elements displayed within an AR system about nearby vehicles.

FIG. 5 illustrates an interior view 500 of the vehicle 100 similar to the view of FIG. 4. However, in FIG. 5, the system 170 is controlling the AR system 180 to render graphics for different nearby vehicles and in two separate forms simultaneously. For example, the view 500 depicts a first vehicle 510 traveling ahead of the vehicle 100 and swerving into the lane of the vehicle 100 from an outside lane. Thus, the engagement system 170 determines that the vehicle 510 is operating erratically and controls the AR system 180 to render an animated thumbs-down 520 over the first vehicle 510 that denounces the determined driving style.

Additionally, the engagement system 170 identifies a second vehicle 530 that is operating in a conservative manner in an inside lane. In this example, the monitoring module 220 produces the behavior characterization as a score on a scale of 1-10 with 10 being safe and 1 being poor/dangerous. Consequently, the monitoring module 220 analyzes sensor data collected about the second vehicle 530 and determines the behavior characterization to be a "9." Therefore, the engagement module 230 controls the AR system 180 to render a number "9" 540 floating over the vehicle 530. In this way, the engagement system 170 provides indicators about driving styles of nearby vehicles using different styles of indicators in order to inform the driver while also engaging the driver with the nearby vehicles.

Figure 6:
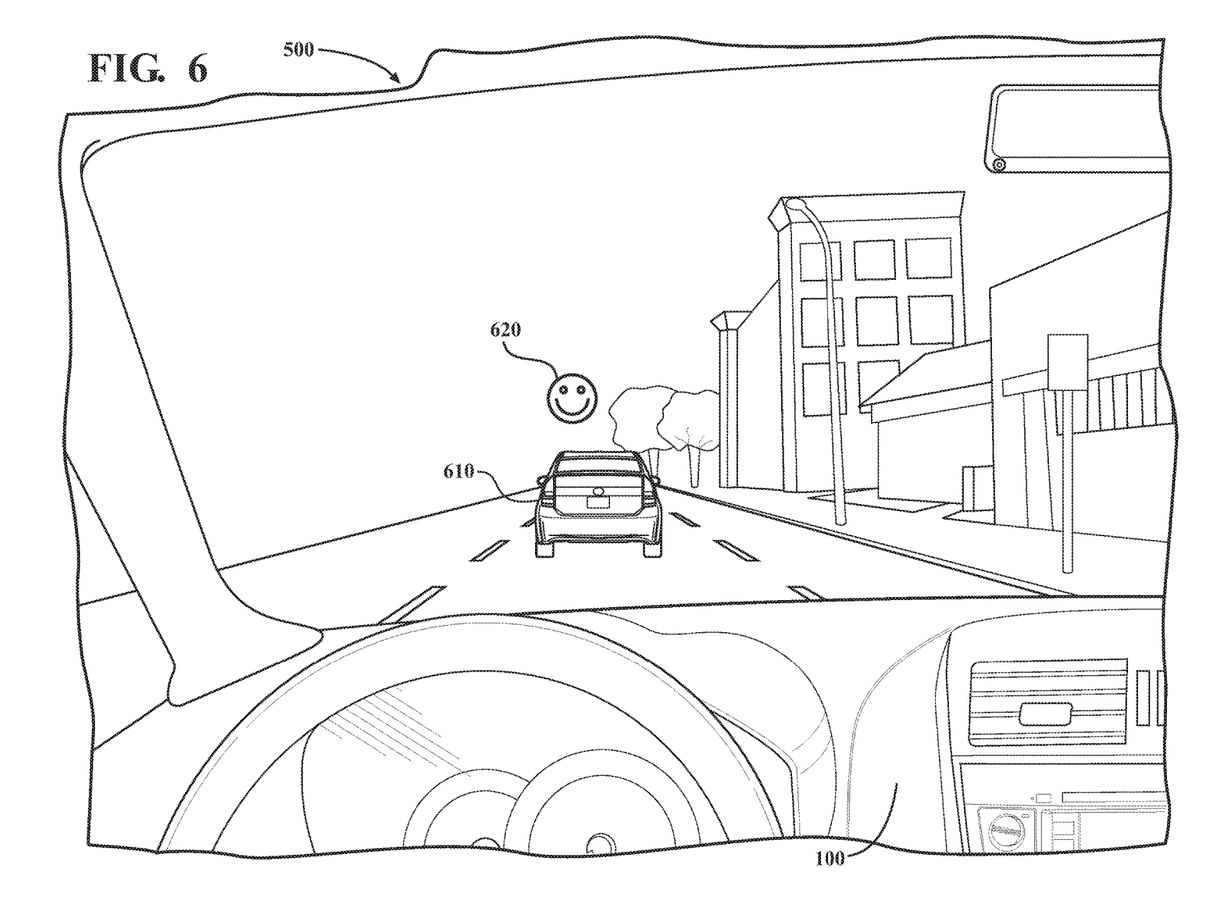
FIG. 6 is an interior view of a primary vehicle including graphical elements displayed within an AR system about behavior characterizations of nearby vehicles.

As a further example, FIG. 6 illustrates a view 600 of a roadway ahead of the vehicle 100. Accordingly, the engagement system 170 detects a vehicle 610 traveling in front of the vehicle 100, collects sensor data about how the vehicle 610 is operating for the present surrounding environment, and produces a behavior characterization when the vehicle 610 moves within a defined range ahead of the vehicle 100.

In the illustrated example of FIG. 6, the engagement system 170 analyzes the sensor data and determines the behavior characterization is a positive example of good driving. Therefore, the engagement system 170 renders a happy face 620 within the AR system 180 above the vehicle 610. Accordingly, the engagement system 170 provides the indication within a view of the driver to inform the driver about the positive driving example and to motivate the driver to provide a similar driving style. In further examples, the engagement system 170 subsequently or contemporaneously collects driver state information to determine whether the driver reacted to the smiley face 620. The system 170 can then, for example, determine if the indication should be adjusted to further emphasize the behavior characterization when, for example, the system 170 determines the vehicle 100 is not being controlled in a safe manner or according to another reason. In either case, the engagement system 170 can dynamically display the behavior indications for various nearby vehicles in order to induce awareness in the driver and engagement by the driver with the vehicle 100.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle driver (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the engagement system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the engagement system 170, and/or the autonomous driving module(s) 160 may control some or all of these vehicle systems 140 and, thus, may be partially or fully autonomous.

The processor(s) 110, the engagement system 170, and/or the autonomous driving module(s) 160 can be operatively connected to communicate with the various vehicle systems 140 and/or individual components thereof. For example, returning to FIG. 1, the processor(s) 110, the engagement system 170, and/or the autonomous driving module(s) 160 can be in communication to send and/or receive information from the various vehicle systems 140 to control the movement, speed, maneuvering, heading, direction, etc. of the vehicle 100. The processor(s) 110, the engagement system 170, and/or the autonomous driving module(s) 160 may control some or all of these vehicle systems 140.

The processor(s) 110, the engagement system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the engagement system 170, and/or the autonomous driving module(s) 160 can control the direction and/or speed of the vehicle 100. The processor(s) 110, the engagement system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the engagement system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An engagement system for inducing awareness in a driver of a primary vehicle about a surrounding environment, comprising:
    one or more processors;
    a memory communicably coupled to the one or more processors and storing:
    a monitoring module including instructions that when executed by the one or more processors cause the one or more processors to, in response to detecting that a nearby vehicle is present within a defined range of the primary vehicle, generate a behavior characterization of the nearby vehicle according to at least sensor data from one or more sensors of the primary vehicle, wherein the monitoring module includes instructions to generate the behavior characterization including instructions to identify behaviors of the nearby vehicle to classify the nearby vehicle according to a driving style that is a safety assessment of how the nearby vehicle is being controlled; and
    an engagement module including instructions that when executed by the one or more processors cause the one or more processors to indicate to the driver of the primary vehicle the behavior characterization of the nearby vehicle to inform the driver of how surrounding vehicles including the nearby vehicle are operating and to induce the driver to be engaged with the surrounding environment of the primary vehicle.

2. The engagement system of claim 1, wherein the monitoring module further includes instructions to generate the behavior characterization of the nearby vehicle including instructions to analyze the sensor data by analyzing one or more of a present trajectory of the nearby vehicle, a projected trajectory of the nearby vehicle, driving patterns of the nearby vehicle, erratic maneuvers of the nearby vehicle, a following distance between the nearby vehicle and the surrounding vehicles, and how closely the nearby vehicle is following speed limits, and
    wherein the monitoring module includes instructions to generate the behavior characterization including instructions to generate the behavior characterization as a score that numerically indicates how safely the nearby vehicle is being controlled.

3. The engagement system of claim 1, wherein the monitoring module further includes instructions to generate the behavior characterization by analyzing the sensor data according to a machine learning algorithm and a driving model to correlate the sensor data with known driving styles, and wherein the driving model indicates likelihoods of correlations between the sensor data about the nearby vehicle and the known driving styles.

4. The engagement system of claim 1, wherein the monitoring module further includes instructions to detect that the nearby vehicle is present including instructions to determine when the nearby vehicle is within the defined range of the primary vehicle by tracking a trajectory and a current position of the nearby vehicle according to the one or more sensors of the primary vehicle, and wherein the defined range is a distance from the primary vehicle that provides for tracking the nearby vehicle beyond the defined range to collect the sensor data for deriving the behavior characterization.

5. The engagement system of claim 1, wherein the engagement module further includes instructions to indicate the behavior characterization to the driver including instructions to display graphics within one or more of an augmented reality display, and an in-dash display.

6. The engagement system of claim 5, wherein the engagement module further includes instructions to display the graphics including instructions to display the behavior characterization as one of a positive indication affirming a driving style of the nearby vehicle and a negative indication denouncing the driving style of the nearby vehicle.

7. The engagement system of claim 1, wherein the engagement module further includes instructions to indicate the behavior characterization for the nearby vehicle including instructions to indicate separate behavior characterizations for multiple surrounding vehicles within the defined range of the primary vehicle simultaneously.

8. The engagement system of claim 1, wherein the monitoring module further includes instructions to collect the sensor data from the at least one sensor by electronically controlling the one or more sensors to scan the surrounding environment for the nearby vehicle and to track the nearby vehicle to acquire the sensor data, wherein collecting the sensor data includes acquiring the sensor data over at least a defined period of time that embodies present driving actions of the nearby vehicle.

9. A non-transitory computer-readable medium for inducing awareness in a driver of a primary vehicle about a surrounding environment and storing instructions that when executed by one or more processors cause the one or more processors to:
in response to detecting that a nearby vehicle is present within a defined range of the primary vehicle, generate a behavior characterization of the nearby vehicle according to at least sensor data from one or more sensors of the primary vehicle,
wherein the instructions to generate the behavior characterization identify behaviors of the nearby vehicle to classify the nearby vehicle according to a driving style that is a safety assessment of how the nearby vehicle is being controlled; and
indicate to the driver of the primary vehicle the behavior characterization of the nearby vehicle to inform the driver of how surrounding vehicles including the nearby vehicle are operating and to induce the driver to be engaged with the surrounding environment of the primary vehicle.

10. The non-transitory computer-readable medium of claim 9, wherein the instructions to generate the behavior characterization of the nearby vehicle include instructions to analyze the sensor data by analyzing one or more of a present trajectory of the nearby vehicle, a projected trajectory of the nearby vehicle, driving patterns of the nearby vehicle, erratic maneuvers of the nearby vehicle, a following distance between the nearby vehicle and the surrounding vehicles, and how closely the nearby vehicle is following speed limits, and
wherein the instructions to generate the behavior characterization include instructions to generate the behavior characterization as a score that numerically indicates how safely the nearby vehicle is being controlled.

11. The non-transitory computer-readable medium of claim 9, wherein the instructions to generate the behavior characterization include instructions to analyze the sensor data according to a machine learning algorithm and a driving model to correlate the sensor data with known driving styles, and wherein the driving model indicates likelihoods of correlations between the sensor data about the nearby vehicle and the known driving styles.

12. The non-transitory computer-readable medium of claim 9, wherein the instructions to indicate the behavior characterization to the driver include instructions to display graphics within one or more of an augmented reality display, and an in-dash display.

13. The non-transitory computer-readable medium of claim 9, wherein the instructions to indicate the behavior characterization for the nearby vehicle include instructions to indicate separate behavior characterizations for multiple surrounding vehicles within the defined range of the primary vehicle simultaneously.

14. A method for inducing awareness in a driver of a primary vehicle about a surrounding environment, comprising:
in response to detecting that a nearby vehicle is present within a defined range of the primary vehicle, generating a behavior characterization of the nearby vehicle according to at least sensor data from one or more sensors of the primary vehicle, wherein generating the behavior characterization identifies behaviors of the nearby vehicle to classify the nearby vehicle according to a driving style that is a safety assessment of how the nearby vehicle is being controlled; and
indicating to the driver of the primary vehicle the behavior characterization of the nearby vehicle to inform the driver of how surrounding vehicles including the nearby vehicle are operating and to induce the driver to be engaged with the surrounding environment of the primary vehicle.

15. The method of claim 14, wherein generating the behavior characterization of the nearby vehicle includes analyzing the sensor data including analyzing one or more of a present trajectory of the nearby vehicle, a projected trajectory of the nearby vehicle, driving patterns of the nearby vehicle, erratic maneuvers of the nearby vehicle, a following distance between the nearby vehicle and the surrounding vehicles, and how closely the nearby vehicle is following speed limits, and
wherein generating the behavior characterization includes generating the behavior characterization as a score that numerically indicates how safely the nearby vehicle is being controlled.

16. The method of claim 14, wherein generating the behavior characterization includes analyzing the sensor data according to a machine learning algorithm and a driving model to correlate the sensor data with known driving behaviors, wherein the driving model indicates correlations between the sensor data and different driving styles, and wherein the behavior characterization indicates whether the nearby vehicle is being driven safely.

17. The method of claim 14, wherein detecting that the nearby vehicle is present includes determining that the nearby vehicle is within the defined range of the primary vehicle by tracking a trajectory and a current position of the nearby vehicle according to at least one sensor of the primary vehicle, and wherein the defined range is a distance from the primary vehicle that provides for tracking the nearby vehicle beyond the defined range to collect the sensor data for deriving the behavior characterization.

18. The method of claim 14, wherein indicating the behavior characterization to the driver includes displaying graphics within one or more of an augmented reality display, and in-dash display, and wherein displaying the graphics includes displaying the behavior characterization as one of a positive indication affirming a driving style of the nearby vehicle and negative indication denouncing the driving style of the nearby vehicle.

19. The method of claim 14, wherein indicating the behavior characterization for the nearby vehicle includes indicating separate behavior characterizations for multiple surrounding vehicles within the defined range of the primary vehicle simultaneously.

20. The method of claim 14, further comprising:
   collecting the sensor data from the at least one sensor by electronically controlling the one or more sensors to scan the surrounding environment for the nearby vehicle and to track the nearby vehicle to acquire the sensor data, wherein collecting the sensor data includes acquiring the sensor data over at least a defined period of time that embodies present driving actions of the nearby vehicle.

* * * * *